United States Patent Office 3,247,236
Patented Apr. 19, 1966

3,247,236
STABILIZATION OF ISOCYANATES
Leon M. Adams, San Antonio, Tex., assignor to Standard Oil Company, Chicago, Ill., a corporation of Indiana
No Drawing. Filed Mar. 19, 1962, Ser. No. 180,832
14 Claims. (Cl. 260—453)

This invention concerns the stabilization of liquid organic isocyanates. More particularly, it pertains to a method for stabilizing such isocyanates with normally gaseous acidic oxides and to the resulting stable isocyanate compositions.

Organic isocyanates are generally prepared through the reaction of phosgene with an amino compound in an organic solvent; the resulting isocyanate product is recovered by distillation and is initially relatively pure. Many organic isocyanates are unstable, however, and polymerize on standing to form such products as cyclic isocyanurates, dimers, oligomers and higher polymers. Such products are particularly undesirable in an organic polyisocyanate since they adversely affect subsequent use of the polyisocyanate in the manufacture of various polymer products.

With the commercial development of polyurethane plastics the use of isocyanates has been increasing. It is desirable that the isocyanate component for a polyurethane plastic be of uniform and high quality so that successive lots of polymer product are of uniform quality. The polymer obtained by reaction of an isocyanate with a hydroxy compound, e.g. 2,4-diisocyanatotoluene with trimethylolpropane, will have physical and chemical properties dependent in large degree upon the purity of the isocyanate. If, prior to being incorporated in a polymer, an isocyanate has undergone self-combination, the extent of reaction with active hydrogen atoms of a co-monomer cannot be as great as that of a pure isocyanate and the polymer product will contain unreacted and undesirable impurities.

Various stabilizers for inclusion in isocyanates to improve stability during storage have been proposed, such as acyl halides, phosgene, carbamyl chloride and phosphorus trichloride and stabilization through floating organic silicones on the surface of liquid isocyanates has been suggested. The stabilizing agents in many cases must be removed prior to the use of the isocyanates to make polymer products and this is especially true of the dissolved stabilizers for they not only inhibit polymerization but also inhibit reactivity in general. If these materials are not removed from organic isocyanates used to make polyurethanes, the lowered reactivity of the isocyanates must be taken into account in manufacturing polyurethanes of uniform quality. Thus it is apparent that if an isocyanate can be stabilized by means of an agent which has not inhibiting effect upon subsequent polymerization and by one which does not require a separation procedure a considerable advantage is obtained.

I have discovered that if a small amount of a normally gaseous acidic oxide selected from the group consisting of carbon dioxide and sulfur dioxide is dissolved in a liquid organic isocyanate, the stability of the isocyanate during storage is improved with respect to unstabilized isocyanate while its reactivity for polyurethane formation is unchanged. Carbon dioxide and sulfur dioxide are about equally effective for stabilizing liquid organic isocyanates. In the small quantities used in my inventive process these gases have no effect on subsequent use of the isocyanates in polyurethane preparation but prevent self-combination of the isocyanate during storage.

The isocyanates which can be stabilized according to my invention are mono- or polyisocyanato-substituted liquid organic compounds. The invention is especially useful when applied to the commercially important diisocyanates used in the manufacture of polyurethane plastics; for example, 2,4-diisocyanatotoluene; 2,6-diisocyanatotoluene; 3,3'-dimethyl-4, 4'-diisocyanatobiphenyl; bis(4-isocyanatophenyl)-methane; α,α'-diisocyanato-m-xylene; 1,6-diisocyanatohexane; etc. Other isocyanates which can be stabilized according to the practice of this invention are, for illustration; isocyanatobenzene; isocyanatobutanes; 1,2,4-triisocyanatobenzene; 2,4-diisocyanatobenzene; 1,3-diisocyanatopropane, isocyanatonaphthalenes, 3-isocyanatopropene, etc. The liquid organic isocyanate can be one which is normally liquid; it can also be a normally solid isocyanate maintained at a temperature slightly above its melting point.

Only a small amount of the normally gaseous acidic oxide is needed for stabilization of a liquid organic isocyanate. Any amount of carbon dioxide up to the saturation point of this gas in the particular isocyanate may be used without adversely affecting the properties of the isocyanate. My preferred range is from about 0.01 weight percent to about 1 weight percent dissolved acidic oxide, and I have found 0.2 weight percent to be especially suitable for the diisocyanatotoluenes. I prefer to use carbon dioxide as the stabilizing acidic oxide since sulfur dioxide tends to cause a slight discoloration of some liquid organic isocyanates during storage. There is no advantage in using amounts of stabilizer greater than the minimum effective amount. The minimum effective amount of stabilizer for a given isocyanate may be conveniently determined by preparing solutions of stabilized liquid organic isocyanate containing different amounts of stabilizer, e.g. 1.0 weight percent, 0.1 weight percent, 0.01 weight percent and 0.001 weight percent, and examining the stabilized samples at periodic intervals for polymer formation. Since carbon dioxide is soluble in the diisocyanatotoluenes to about 0.2 weight percent at 75° F. it is convenient to stabilize these compounds by bubbling in carbon dioxide until the saturation point is reached. Sulfur dioxide is much more soluble in these isocyanates than carbon dioxide and is not, therefore, so conveniently used.

The following examples are presented as illustrations of the practice of my invention. The diisocyanates for these tests were prepared through the usual reaction between a diamine and phosgene followed by isolation of the diisocyanate product by distillation. Examples I and II are the same diisocyanate made in two separate preparations.

*Example I*

Two samples of freshly distilled α,α'-diisocyanato-m-xylene containing 0.006 percent hydrolyzable chloride were placed in separate glass vials. Carbon dioxide was bubbled through one sample until it appeared to be gas saturated. The other sample was not treated. In less than one week the untreated sample was converted to a solid polymer; the carbon dioxide treated sample was unchanged when inspected ten days and six weeks after treatment.

*Example II*

A carbon dioxide treated sample and an untreated sample of α,α'-diisocyanato-m-xylene containing 0.05 percent hydrolyzable chloride were prepared as in Example I. The untreated sample was clouded with polymer material within three days; the treated sample was still clear after standing fifteen days.

*Example III*

Six samples of a mixture of freshly distilled 2,4- and 2,6-diisocyanatotoluene were prepared. Two of these were treated with carbon dioxide as in Example I; two more were treated with a small amount of sulfur dioxide. The other two samples were used as untreated controls. After one month there was no detectable polymer in any of the four treated samples; one control contained polymer; the other remained clear. The samples treated with sulfur dioxide had developed a yellow collor.

It is evident from these experimental results that a normally gaseous acidic oxide such as carbon dioxide or sulfur dioxide effectively stabilizes a liquid organic isocyanate against polymerization when dissolved therein.

What I claim is:

1. A composition consisting of a liquid organic isocyanate, having only isocyanato substituent groups, containing from about 0.01 to about 1.0 weight percent of a normally gaseous acidic oxide selected from the group consisting of carbon dioxide and sulfur dioxide.

2. A composition consisting of a liquid organic aromatic isocyanate, having only isocyanato substituent groups, containing from about 0.01 to about 1.0 weight percent of a normally gaseous acidic oxide selected from the group consisting of carbon dioxide and sulfur dioxide.

3. Compositions consisting of diisocyanato toluenes containing from about 0.01 to about 1.0 weight percent of dissolved carbon dioxide.

4. Compositions consisting of diisocyanato toluenes containing from about 0.01 to about 1.0 weight percent of dissolved sulfur dioxide.

5. A composition consisting of $\alpha,\alpha'$-diisocyanato-m-xylene containing from about 0.01 to about 1.0 weight percent of dissolved carbon dioxide.

6. A composition consisting of $\alpha,\alpha'$-diisocyanato-m-xylene containing from about 0.01 to about 1.0 weight percent of dissolved sulfur dioxide.

7. The method of improving the storage stability of liquid organic isocyanates, having only isocyanato substituent groups, which comprises maintaining in said isocyanates during storage a stabilizing amount of a normally gaseous acidic oxide selected from the group consisting of carbon dioxide and sulfur dioxide.

8. The method of improving the storage stability of liquid organic aromatic isocyanates, having only isocyanato substituent groups, which comprises maintaining in said isocyanates during storage a stabilizing amount of from about 0.01 to about 1.0 weight percent of a normally gaseous acidic oxide selected from the group consisting of carbon dioxide and sulfur dioxide.

9. The method of improving the storage stability of liquid organic aromatic isocyanates, having only isocyanato substituent groups, which comprises maintaining in said isocyanates during storage a stabilizing amount of from about 0.01 to about 1.0 weight percent of carbon dioxide.

10. The method of improving the storage stability of liquid organic aromatic isocyanates, having only isocyanato substituent groups, which comprises maintaining in said isocyanates during storage a stabilizing amount of from about 0.01 to about 1.0 weight percent of sulfur dioxide.

11. The method of improving the storage stability of diisocyanato toluenes, which comprises maintaining in said isocyanates during storage a stabilizing amount of from about 0.01 to about 1.0 weight percent of dissolved carbon dioxide.

12. The method of improving the storage stability of diisocyanato toluenes, which comprises maintaining in said isocyanates during storage a stabilizing amount of from about 0.01 to about 1.0 weight percent of dissolved sulfur dioxide.

13. The method of improving the storage stability of $\alpha,\alpha'$-diisocyanato-m-xylene, which comprises maintaining in said isocyanate during storage a stabilizing amount of from about 0.01 to about 1.0 weight percent of dissolved carbon dioxide.

14. The method of improving the storage stability of $\alpha,\alpha'$-diisocyanato-m-xylene, which comprises maintaining in said isocyanate during storage a stabilizing amount of from about 0.01 to about 1.0 weight percent of dissolved sulfur dioxide.

References Cited by the Examiner

UNITED STATES PATENTS

| | | | |
|---|---|---|---|
| 2,437,867 | 3/1948 | Verbanc | 260—453 |
| 2,885,423 | 5/1959 | Spiegler | 260—453 |
| 3,035,078 | 5/1962 | De Long et al. | 260—453 |

OTHER REFERENCES

Arnold et al.: Du Pont Technical Bulletin HR–2, Jan. 20, 1956, pp. 5, 14.

Bailey et al.: Ind. and Eng. Chem., vol. 48, pp. 794–795, April, 1956.

Technical Bulletin TS–2, Allied Chemical Corporation, July 15, 1958, pp. 1–2.

CHARLES B. PARKER, *Primary Examiner.*

IRVING MARCUS, *Examiner.*